Figure 1:
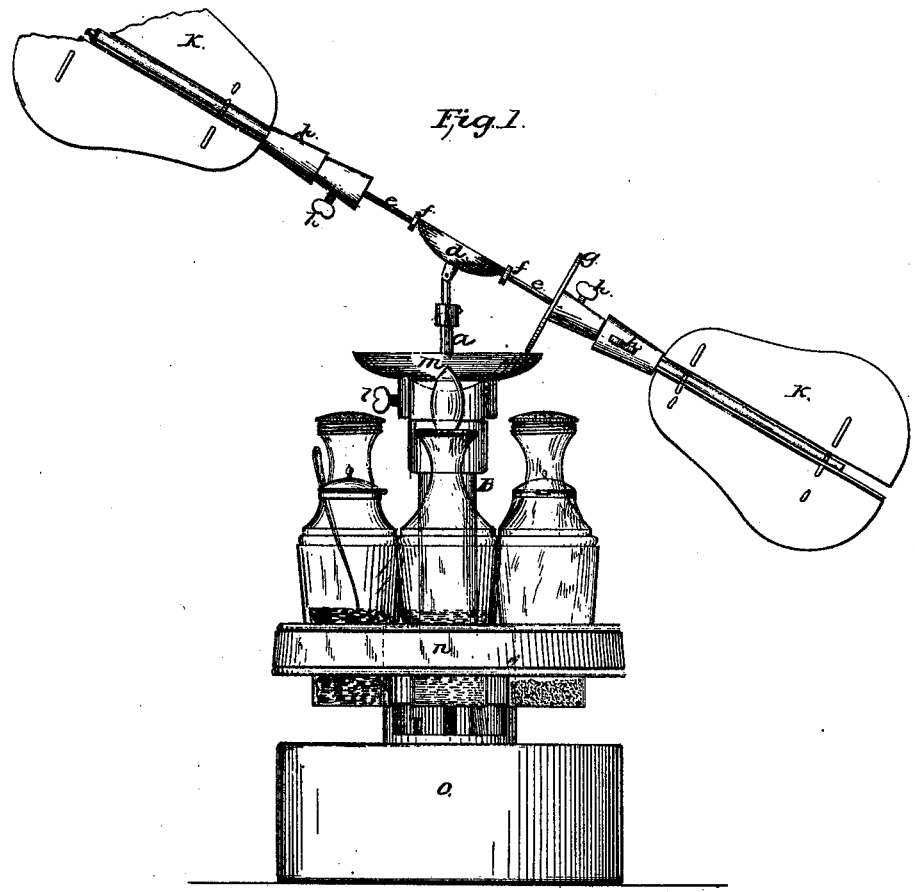
Figure 2:
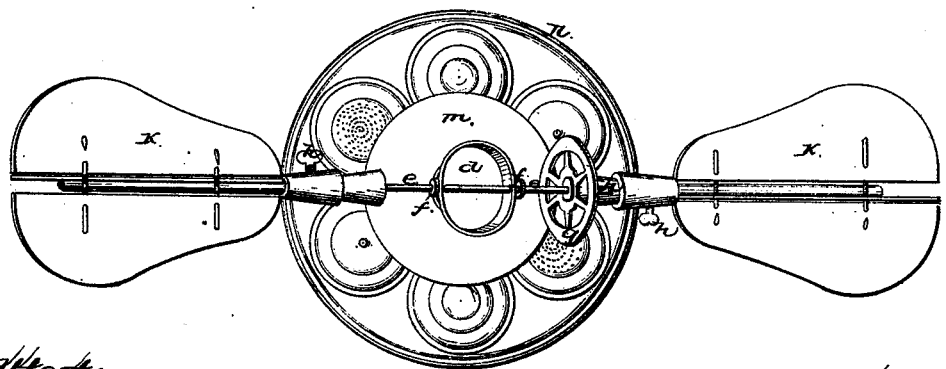

G. R. KRESS.
Automatic Fan Attachment.

No. 206,183. Patented July 23, 1878.

Attest:

Inventor:

UNITED STATES PATENT OFFICE.

GEORGE R. KRESS, OF PITTSBURG, PENNSYLVANIA.

IMPROVEMENT IN AUTOMATIC-FAN ATTACHMENTS.

Specification forming part of Letters Patent No. 206,183, dated July 23, 1878; application filed October 15, 1877.

*To all whom it may concern:*

Be it known that I, GEORGE R. KRESS, of Pittsburg, in the county of Allegheny, in the State of Pennsylvania, have invented an Improved Automatic-Fan Attachment for Casters; and I do hereby declare that the following is a full and exact description thereof, reference being had to the accompanying drawings and to the letters of reference marked thereon.

The nature of my device consists in an upright shaft, $a$, capable of extension or contraction by means of the thumb-screw $c$, caused to revolve by means of clock-work in the base of the machine; and passing through the center of the post B, to the upper end of which is attached the extension adjustable hinging box-bearing $d$, and through which passes the horizontal shaft $e$, with the collars $f\,f$, and having secured thereon, also, the wheel $g$, and upon the ends of which, by means of the thumb-screws $h\,h$, is attached the adjustable extension fans or brushes K K.

At the top of the post B, by means of the thumb-screw $l$, is secured the adjustable extension hinging collar circular platform $m$, upon which the horizontal-shaft wheel $g$ rests, and thus when in motion giving to the fly-fans or brushes two rotary motions—viz., first around the upright shaft $a$ as an axis, and, second, around the horizontal shaft $e$ as an axis.

The circular bottle-tray is represented by $n$. The post B rests upon and is fastened in the circular-box base O, which contains the clock-work gearing for giving the revolving motion to the upright shaft, the whole device, as set forth, and combining, as it does, the duplex motion of the fans and the arrangement of the bottle-tray, making an effective fly and insect fan, a caster, and an ornamental piece of table-furniture.

What I claim as my improvement in automatic-fan attachments for casters, and desire to secure by Letters Patent, is—

1. The adjustable hinged box-bearing $d$, constructed and arranged to operate substantially as set forth.

2. The wheel $g$ on the horizontal shaft $e$, in combination with the collar circular platform $m$, substantially as and for the purposes as set forth.

3. The adjustable extension hinged collar circular platform $m$, constructed and arranged to operate substantially as set forth.

GEORGE R. KRESS.

Witnesses:
H. R. McCLELLAND,
WINFIELD S. WILSON.